United States Patent [19]
Moss

[11] 4,085,707
[45] Apr. 25, 1978

[54] COMBUSTION OR PART-COMBUSTION IN FLUIDIZED BEDS

[75] Inventor: Gerald Moss, Oxford, England

[73] Assignee: Exxon Research & Engineering Co., Linden, N.J.

[21] Appl. No.: 657,540

[22] Filed: Feb. 12, 1976

[30] Foreign Application Priority Data

Feb. 14, 1975 United Kingdom ............. 6355/75

[51] Int. Cl.² .................. F22B 1/02; F23D 19/00
[52] U.S. Cl. ................. 122/4 D; 110/263; 201/31; 110/347
[58] Field of Search .......... 122/4 D, 4; 110/28 J, 110/8 F, 1 J; 201/31

[56] References Cited

U.S. PATENT DOCUMENTS

| | | | |
|---|---|---|---|
| 2,445,327 | 7/1948 | Keith | 201/31 |
| 2,582,711 | 1/1952 | Nelson | 201/31 |
| 2,582,712 | 1/1952 | Howard | 201/31 |
| 2,818,049 | 12/1957 | Blaskowski | 122/4 |
| 2,871,004 | 1/1959 | Gorin | 110/28 |
| 3,171,369 | 3/1965 | Stephens, Jr. et al. | 110/28 |
| 3,384,557 | 5/1968 | Saller | 201/31 |
| 3,807,090 | 4/1974 | Moss | 110/28 |
| 3,905,336 | 9/1975 | Gamble et al. | 122/4 |

Primary Examiner—Kenneth W. Sprague
Attorney, Agent, or Firm—Wayne Hoover; Ernest A. Forzano

[57] ABSTRACT

In the partial or full combustion of fuels in a fluidized bed, the provision of heat transfer surfaces within the bed impedes particle circulation resulting in localized regions of relative intense chemical reaction which can damage the heat transfer surfaces and cause detrimental physical and/or chemical changes in the bed particles. This problem is exacerbated when the bed is relatively deep and narrow and when the part of full combustion is effected under pressure. In the invention, at least one conduit connects an upper region of the bed to a lower region of the bed, and expedients are provided to cause a downward particle flow through the conduit(s) thereby promoting an upward flow in the bed. Heat exchange surfaces may be in the bed and/or in the conduit(s).

25 Claims, 4 Drawing Figures

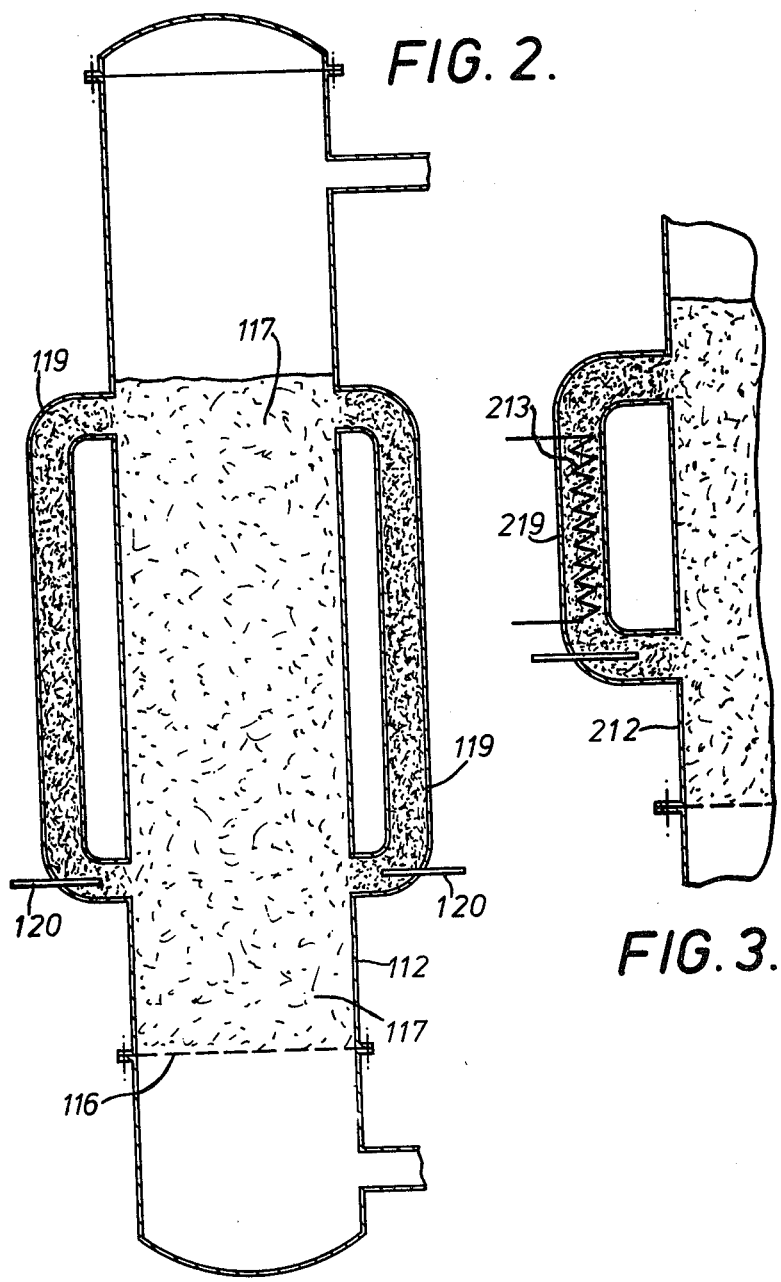

COMBUSTION OR PART-COMBUSTION IN FLUIDIZED BEDS

The present invention relates to combustion or part-combustion in fluidized beds.

Fluidized beds are favoured for the part or complete combustion of fuels in some applications, and usually, a bed of particles is laterally contained by the walls of a containing vessel and supported above a base, the particles being fluidized by an upwardly passing oxygen-containing gas (e.g., air) and the fuel being passed into the bed for part or full combustion thereof.

In some instances, control of the temperature in the bed is desirable to maintain a selected bed temperature or range of temperatures or to remove the useful heat of combustion of the fuel for purposes such as raising steam. For example, when a fuel is being completely combusted, the heat generation may be undesirably high, locally, and the particles may agglomerate or sinter with each other and/or with material from the fuel (e.g., ash, when the fuel is coal or a like carbonaceous material) and adversely affect the fluidization within the bed. If the particles are chemically active, e.g., for absorbing and/or fixing sulphur from the fuel by chemical reaction therewith, high temperatures may adversely affect the chemical reactivity of the particles and/or the stability of any sulphur compounds formed therewith. Moreover, if heat transfer surfaces, e.g., in the form of heat exchange tubes are disposed in the bed for purposes such as steam-raising or thermal treatment of process feedstocks such as steam cracker feedstocks, the foregoing problems tend to be aggravated since the heat transfer surfaces tend to impede and reduce the upward transport and downward recirculation of particles in the bed, and regions of excessively hot particles may, in consequence, form beneath the heat transfer surfaces. When this happens, there is also the additional risk of damage to the heat transfer surfaces.

Although the foregoing drawbacks have been referred to in relation to full combustion, they may also occur in the partial combustion of fuel in a fluidized bed, and at least some of the problems become increasingly acute when the fluidized bed combustion or part-combustion is effected under higher pressure since the combustion intensity or heat release per unit volume of bed increases with increased operating pressure. From the point of view of the efficiency of heat transfer from the bed to a heat receiving fluid passing in contact with heat transfer surfaces, the increased combustion intensity is advantageous. Moreover, the overall size of the apparatus can be reduced at least to some extent by operation at elevated pressure. When heat transfer surfaces are disposed in the bed, it is convenient, from the constructional and operational point of view, to employ a relatively deep bed with the heat transfer surfaces "stacked" in the bed (e.g., in a coil-like form when the surfaces are provided by a tube through which a fluid passes). Such an arrangement facilitates matching the combustion intensity with the heat transfer surface area, but the aforementioned problems of fluidized bed combustion or part-combustion tend to be aggravated by the obstructing of upward and downward movement of the fluidized particles in the bed by the vertically extensive heat transfer surfaces. As mentioned above, the problems become increasingly acute as the operating pressure in the bed is increased.

According to one aspect of this invention, the foregoing drawbacks and problems are mitigated by ensuring that the fuel is relatively uniformly dispersed within the bed during operation so that combustion or part-combustion takes place more uniformly throughout the bed.

In another aspect of the invention, particles are circulated via a transfer duct from one part of a bed of fluidized particles to a second part of the bed, fuel preferably or conveniently being mixed with the particles before or as they enter the second part of the bed, the fuel being at least partially combusted in the bed.

In a further aspect, the invention comprehends apparatus for at least partial combustion of fuel in a bed of fluidized particles, comprising a vessel defining a volume for containing, in at least a portion of said volume, a bed of fluidizable particles, a transfer duct extending between one part of said portion and a second part of said portion, and means for passing fuel in the second part of the bed.

The present invention also comprises a method of at least partly combusting a fuel at an elevated temperature in a bed containing particles which are fluidized by an upwardly passing gas capable of converting the fuel to at least partly combusted gaseous products at the elevated temperature, comprising passing a mixture comprising the fuel and fluidizable particulate solids into a bottom region of the bed so that the fuel when within the bed is dispersed at least among the particulate solids whereby the conversion of the fuel is effected in an extended portion of the bed volume, and causing or permitting particles to leave a top region of the bed whereby to maintain the top of the bed at approximately a substantially constant level and promoting a generally upward movement of particles and any other materials in the bed.

At least some of the particles leaving the top region of the bed may be employed as the particulate solids in the said mixture comprising fuel and particulate solids. The particulate solids may consist of particles from the top region of the bed.

Preferably, the particles which leave the top region of the bed pass into the top of a duct in which they pack to a greater apparent density than the apparent density of the bed. the mixture of fuel and solids is preferably pneumatically conveyed or transported from the duct into the bottom region of the bed by a pneumatic conveying or transporting gas, which gas may also be used to mix the fuel with the particles.

Heat generated in the bed may be removed by heat transfer surfaces within the bed above the said bottom region and below the said top region thereof. Alternatively or in addition, heat may be removed by heat transfer surfaces which are contacted by particles which have left the top region of the bed, e.g., heat transfer surfaces in the duct.

The particles may comprise coke; if it is desired to burn or partially burn a sulphur-containing fuel to give substantially sulphur-free gaseous products, the particles may comprise alkaline earth metal oxide (e.g., CaO).

The part or full combustion is preferably performed at elevated pressures.

The particles may comprise alkali metal compounds, particularly when the fuel is to be converted to a hydrogen-rich or methane-rich product by gasification with steam and an oxygen-containing gas. The bed temperature may be in the range of from 800° to 1500° C.

The invention further comprises apparatus for use in at least partly combusting a fuel at an elevated temperature in a bed of fluidizable particles, comprising a vessel for containing the bed in a selected volume thereof, a gas distributor for distributing a fluidizing gas into the bottom of said volume substantially uniformly across the horizontal cross-section of the bottom of said volume, a conduit above the top of said volume through which gas leaving the volume can pass out of the vessel, at least one duct having an upper end open to a top region of the bed volume and a lower end open to a bottom region of the bed volume so as to provide communication through the duct between top and bottom regions of the bed, the duct being so constructed and/or arranged that substantially no fluidizing gas will pass thereinto and so that particles will enter the upper end of the duct and pack in the duct to a greater apparent density than the apparent density of the bed, and fuel feeding means for mixing fuel with packed particles in the duct and for passing the mixture of fuel and particles into the bed volume from the lower end of the duct.

Preferably, the duct comprises a substantially vertical part between the upper and lower ends, which part is outside the vessel.

In preferred embodiments, the particles are selected so as to be capable of absorbing and/or fixing elements whose presence, either in elemental or chemically combined form is not desired in the gases leaving the bed. For example, the particles may comprise at least one alkaline earth metal oxide or a thermal precursor thereof such as alkaline earth metal carbonate in order to fix sulphur from the fuel by chemical reaction therewith. The particles may alternatively, or in addition, comprise inert material such as ash and/or sand and/or a catalyst to promote the partial or full combustion and possibly other chemical reactions.

The transfer duct may be inside or outside the vessel, but the latter is generally preferred. By the use of the invention, the fuel may be introduced into the fluidized bed in a "diluted" form, the diluent being the particles from the transfer duct.

Preferably, the transfer duct extends from an upper region of the bed to a lower region, and more preferably in the case where there are heat transfer surfaces within the portion of the vessel volume which is occupied by the bed during operation, the said one part of the portion is above the level of the top of the heat transfer surfaces and the said second part is below the level of the bottom of the heat transfer surfaces.

The invention is particularly, although not exclusively, suitable for part or full combustion under superatmospheric pressures (e.g., 3 to 50 atmospheres, preferably 8 to 16 atmospheres). Any fuel may be employed, but the drawbacks of high pressure operation tend to be more acute with solid fuels, and particular benefits are realized when the invention is practiced with solid fuels.

Some embodiments of the invention, given by way of non-limitative examples only, are now described with reference to the accompanying drawings, in which FIG. 1 shows, partly schematically, a diagrammatic vertical cross-section through the principal parts of apparatus for use in the part or complete combustion of a fuel in a bed of fluidized particles under superatmospheric pressure, such as 10 atmospheres or thereabouts;

FIG. 2 shows, diagrammatically, a vertical cross-section through a vessel for use in the partial or complete combustion of a fuel;

FIG. 3 shows, diagrammatically an arrangement of heat transfer surfaces; and

Figure 1:
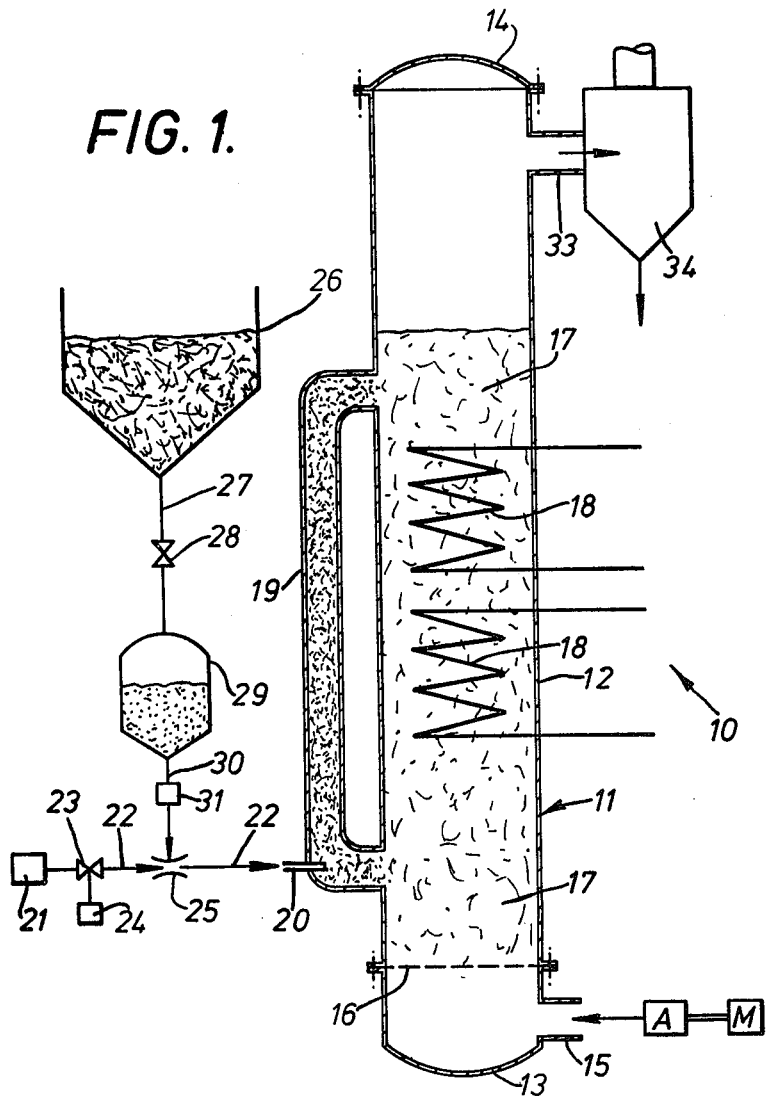

Referring first to FIG. 1, the apparatus comprises a pressure-resistant vessel 11 of relatively conventional construction formed from a cylindrical main section 12 arranged with its axis substantially vertical, the axial ends of the vessel 11 being closed by a bottom dished end housing 13 and a top dished end housing 14 which are either welded or attached by bolted flanges to flanges at the ends of the main section 12 of the vessel 11.

The bottom housing is provided with an air inlet duct 15 through which, during operation, air supplied from a suitable source such as air compressor A driven by motor M at substantially the operating pressure in the vessel 11 is admitted to the vessel 11, and between the bottom housing and the main vessel section 12 is located a distributor 16 for passing the air into the interior of the main section 12 substantially uniformly over the cross-section thereof. The distributor 16 defines the lowest extent of a bed 17 of fluidizable particles laterally contained by the main vessel section 12. The air passing through the distributor is supplied at a rate adequate to fluidize the particles of the bed 17, and the fluidized bed 17 may have a depth of up to 40 feet, e.g., about 15 feet, the vessel diameter being from 1 to 20 feet, e.g., about 5 feet.

Heat transfer surfaces in the form of heat exchanger tubes 18 (shown diagrammatically) are immersed in the bed 17. In practical embodiments, the heat exchanger tubes 18 are preferably vertical heat exchanger tubes. Whatever the form of the tubes 18, for maximum utilisation of the space within the bed 17, they will so extend that they occupy a considerable part of the bed volume in order to extract or recover as much heat as is practically possible or necessary from the bed 17 during operation. It will be appreciated that the more extensive the tubes 18, the greater will be the impediment to upward fluidized transport of particles from lower regions of the bed 17 and to downward recirculation from upper regions of the bed 17.

Fuel is passed into the bed 17 below the heat transfer tubes usually a short distance above the distributor 16 — e.g., from 6 inches to 3 feet (e.g., about 12 inches) above the distributor. The fuel burns on contact with the air to an extent determined by the relative fuel and air proportions, and the heat of combustion is taken up by the particles of the bed. It will be appreciated that if the fuel were to be passed directly into the bed as so far described, the restriction to particle circulation caused by the heat exchanger tubes 18 would confine the combustion mainly to the lower part of the bed 17 thereby reducing the efficiency of utilization of the heat exchanger tube surfaces as a whole (those near the top of the bed receiving only a minor proportion of the heat) and causing combustion intensities which could be so high as to cause sintering and/or agglomeration of the particles (resulting in partial defluidization of the bed and possibly obstruction of the distributor 16) and damage to the lowermost heat exchanger tubes. The risk of sintering and agglomeration is increased when the fuel is one which contains ash in significant amounts (e.g., coal).

In order to promote mass and heat transfer within the bed, the apparatus 10 comprises at least one downcomer conduit 19 (only one being shown) which extends from a top region at or near the top level of the bed 17 above the heat exchanger tubes 18 to a bottom region at or near the bottom level of the bed below the heat exchanger tubes 18, above the distributor. The downcomer 19 is preferably outside the main section 12 of the vessel although it may alternatively or additionally be within the vessel. Substantially none of the upflowing gas in the vessel 12 can pass into the downcomer 19 and the solids which pass thereinto will not be fluidized to any significant extent and will pack to a relatively high apparent density. A downward flow of particles through the downcomer 19 may take place automatically as a result of the higher apparent density of the solids in the downcomer relative to the lower apparent density of fluidized solids in the bed 17 if the design of the downcomer 19 is such that frictional resistance therein is sufficiently low. Where the frictional resistance is not sufficiently low, the solids flow therethrough is preferably promoted by intermittently or continuously blowing a gas (such as air, flue gas) into the bottom horizontal section of the downcomer 19 in the direction of the interior of the bed 17 so that particles are pneumatically transported out of the bottom of the downcomer into the bed 17. Because of this downward particle flow in the downcomer 19, a corresponding upflow of particles is promoted in the bed 17 thereby mitigating the problems of impeded particle transfer in the bed 17.

Conveniently, the fuel (e.g., coal particles) may be passed into the bed 17 in admixture with the particles which are thus pneumatically transported.

To this end, a fuel injector pipe 20 extends into the lower, approximately horizontal, part of the downcomer 19, just inwardly of the region where it forms an elbow-like bend with the vertical part of the downcomer. The bend promotes packing of the particles in the vertical part of the downcomer 19.

The fuel injector pipe 20 is connected to a source 21 of compressed air, which acts as a pneumatic conveying or transporting gas, and a hopper or other container 22 containing particles of coal. A valve 23, regulated by a controller 24 determines the rate of the flow of air to the pipe 20 through a connecting line 22. The connecting line 22 includes a venturi or nozzle 25 where the flowing air entrains powdered coal. The powdered coal is initially supplied to a conventional hopper 26, and passes downwardly therefrom via line 27 and a suitable air-pressure lock system 28 of conventional design to a pressurized hopper 29. The conical base of the pressurized hopper 29 communicates with a line 30, having a coal flow-regulator 31 (e.g., a screw feeder), and is connected into the venturi 25 in such a way that powdered coal flowing intermittently downwardly from the intermittently open regulator 31 will be entrained in, and pneumatically conveyed by, the air passing through the venturi 25. The coal particles are mixed with bed particles in the lower part of the downcomer 19 on leaving the open end of the injector pipe 20, and the air stream pneumatically conveys or transports the resulting mixture of coal particles and bed particles into the lower region of the bed 17. The valve 23 may alternatively be so controlled by the regulator 24 as to open intermittently, so that a mixture of coal and bed particles is conveyed or transported pneumatically into the bed intermittently.

As packed bed particles leave the bottom lower end of the downcomer 19, bed particles packed in the downcomer move downwardly, and particles pass into the upper end of the downcomer from an upper region of the bed 17. It will be appreciated from the foregoing that operation of the apparatus as described promotes an upward circulation of particles in the bed 17.

The coal introduced into the bed is dispersed by admixture with the particles conveyed out of the downcomer 19, and the intensity of combustion is reduced compared to the combustion intensity which would prevail were the coal particles not so dispersed. Accordingly, the risk of damage to the heat exchanger tubes 18 by excessive heat is reduced.

The disposition of the heat exchanger tubes 18 within the bed 17 hinders the circulation of bed particles, and in the absence of other influences, would tend to maintain the main zone of combustion relatively low down in the bed (e.g., between the level of the lower end of the downcomer 19 and the lower heat exchanger tubes so that the latter would be most exposed to conditions promoting heat erosion while upper heat exchanger tubes 18 would be under-utilized). However, in the practice of the invention, the promoted upflow of bed material together with the dispersion of the entering coal particles, ensures a more uniform combustion intensity vertically in the bed and a more efficient utilization of the heat exchanger tube surfaces is possible.

The rate of particle movement down the downcomer 19 is regulatable, within certain limits, by the rate of pneumatic transfer of particles from the lower portion of the downcomer 19, and since the net rate of particle upflow in the bed 17 depends on the particle flow rate in the downcomer 19, the net rate of particle upflow in the bed 17 can also be controlled.

The cross-sectional flow area of the downcomer 19 need not be a large proportion of the cross-sectional area of the vessel, unless it is desired to regulate the bed particle upflow rate to a relatively high flow rate. For ensuring adequate dispersion of the coal particles entering the bed 17, the cross-sectional area of the downcomer 19 need not exceed 6% of the area of the vessel 12, and in many instances, from 2 to 4%, e.g., about 3% of the area of the vessel 12 is adequate.

The gases leaving the bed 17 pass out of the vessel 12 via a duct 33, and are freed of all but the finer solids by a cyclone 34. For the production of a combustible gaseous product, the oxygen of the compressed gas supplied by compressor A should be insufficient for the complete combustion of the coal, and steam may be mixed with the gas entering duct 15 to generate a hydrogen-containing combustible gas product. The conversion of the coal to gases containing hydrogen and methane may be promoted by including suitable catalysts such as alkaline earth metal compounds in the bed particles.

When the bed particles comprise alkaline earth metal oxides such as CaO, sulphur from the fuel is fixed as either $CaSO_4$ when the bed is operated under conditions to produce heat, the resulting flue gas being substantially sulphur-free, or CaS when the bed is operated under conditions to produce a combustible or reducing or methane-containing gas, the latter then being substantially sulphur-free. The activity of the bed 17 for fixing sulphur from the fuel may be maintained by the addition of fresh CaO-containing particles, or a precursor such as limestone or delomite. A bleed of particles equivalent to the amount of fresh particles added must be removed to maintain a constant quantity of material in the bed 17.

The avoidance of high local combustion intensities tends to maintain the chemical reactivity of the CaO-containing particles.

In FIG. 2, there is shown a vessel 112 which is provided with a plurality of downcomers 119, preferably symmetrically arrayed, of which two are shown. Fuel is injected via pipes 120 into the bottom of the downcomers so as to mix with the packed bed particles therein, and the fuel-particles mixture is pneumatically passed into the fluidized bed 117 so as to be dispersed relatively uniformly therein. The bed 117 is supported above a distributor 116 which distributes an oxygen-containing fluidizing and conversion gas into the bed 117.

The vessel 112 of FIG. 2 functions in the same way as that of FIG. 1, but the provision of a plurality of downcomers makes it possible to promote a higher particle upflow rate in the bed 117 and to convert (e.g., partly or fully burn) a relatively greater amount of fuel. In cases when the vessel 112 is relatively wide, it may be advantageous to have a plurality of downcomers to ensure good fuel dispersion within the bed 117.

Heat exchange surfaces may be provided in the downcomer(s) 19 or 119 of FIGS. 1 and 2 in addition to, or alternatively to, the heat exchanger tubes 18 shown in FIG. 1. When the heat exchange surfaces are entirely in the downcomer(s), there is no impediment to particle movement in the bed and more uniform fuel conversion conditions may be obtained, and higher bed temperatures which might damage heat exchanger tubes 18 can be used. In one embodiment wherein the heat transfer surfaces are in the downcomer(s), the particles in the bed may comprise coke which is converted to a fuel gas or methane-containing gas in the bed, the coke passing through the downcomer(s) being cooled and mixed with powdered coal so that on injection of the coke-coal mixture into the bed, the volatile material is liberated from the coal, thereby enriching the gas leaving the bed, and the coal sticks to the coke as it reaches its sticky phase temperature, thereby maintaining the coke particles at a substantially constant mean size so that elutriation of convertible materials out of the bed is kept at a low level.

FIG. 3 shows, diagrammatically, a downcomer 219 connected to a fluid-bed containing vessel 212 with heat exchange surfaces 213 within the downcomer.

The heat exchange surfaces 213 may take any of the well-known forms such as heat exchanger tubes which may be finned and vertical in the downcomer 219, and-/or conventional water walls (i.e., the internal walls of the downcomer 219 may be hollow to receive a heat removal fluid such as water), and/or tubes which extend horizontally across the downcomer, and preferably so arranged that particles which have contacted a horizontal tube are mixed with particles which have not contacted that tube as the particles move downwardly toward a subsequent horizontal heat transfer tubes. None of the foregoing arrangements of heat exchange surfaces in the downcomer(s) is illustrated but they will also be known or realizable by a technologist skilled in the art.

Figure 4:
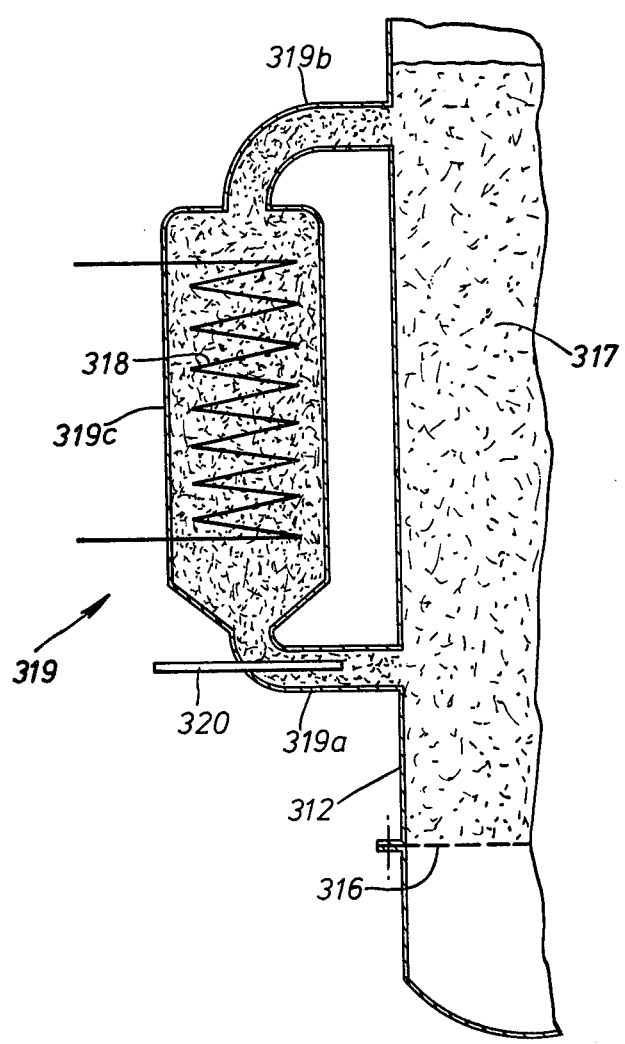
FIG. 4 shows, diagrammatically, part of another vessel in vertical cross-section for the partial or complete combustion of a fuel.

FIG. 5 shows a downcomer 319 connected to a vessel 312 containing a fluidized bed 317 supported on a gas distributor 316. Fuel is injected into the lower part 319a of the downcomer 319 from an injector tube 320 and bed particles pass from the bed 317 into the upper part 319b of the downcomer 319. Between the parts 319a and 319b, the downcomer has a vessel 319c containing at least one relatively large heat exchanger 318. The vessel 319c may be of a size which is of the same order as that of the vessel 312. In this embodiment, the vessel 312 may serve entirely as a fuel conversion vessel, while the downcomer 319 functions, inter alia, as the heat removal means. Thus, an arrangement such as that shown in FIG. 4 is useful in the complete combustion of fuel under pressure in the bed 317, with heat recovery employing the heat exchanger 318 in vessel 319c. The hot pressurized flue gas, which may be substantially sulphur and vanadium and sodium-free if the bed 317 contains alkaline earth metal oxide (e.g., CaO), may (after suitable de-dusting) be employed to drive a gas turbine and/or to raise steam in waste heat recovery equipment.

A flow of particles upwardly in the bed 317 and downwardly in the downcomer 319 is promoted by pneumatically conveying the mixture of particles and injected fuel (from the injector 320) into the bed 317.

It will be appreciated that the different downcomer and heat exchanger arrangements described above may be employed in combinations other than those specified.

The preferred fuels are solids, such as coal, semi-coal, lignite and peat, but fuel-containing solids of semi-solids such as asphalt, tar-sands and shales may also be used.

We claim:

1. A method of at least partly combusting a solid or semi-solid fuel at an elevated temperature in a bed containing particles which are fluidized by an upwardly passing gas capable of converting the fuel to at least partly combusted gaseous products at the elevated temperature, comprising passing a mixture comprising the fuel and non-combustible fluidizable particulate solids into a bottom region of the bed so that the fuel when within the bed is dispersed at least among the particulate solids whereby the conversion of the fuel is effected in an extended portion of the bed volume, and causing or permitting particles to leave a top region of the bed, wherein at least some of the particles which leave the top portion of the bed are employed as particulate solids in said mixture comprising fuel and particulate solids, whereby to maintain the top of the bed at approximately a substantially constant level and promoting a generally upward movement of particles and any other materials in the bed.

2. A method according to claim 1 in which the particles which leave the top region of the bed pass into the top of a duct in which they pack to a greater apparent density than the apparent density of the bed.

3. A method according to claim 2 in which the mixture of fuel and solids is pneumatically conveyed or transported from the duct into the bottom region of the bed by a pneumatic conveying or transporting gas.

4. A method according to claim 3 in which the fuel is mixed with the solids by a gas which is employed as the pneumatic conveying or transporting gas.

5. A method according to claim 4 in which heat generated in the bed by the conversion of the fuel is removed by contacting particles with heat transfer surfaces.

6. A method according to claim 5 in which the heat transfer surfaces are within the bed above the said bottom region and below the said top region thereof.

7. A method according to claim 5 in which the heat transfer surfaces contact particles which have left the top region of the bed.

8. A method according to claim 7 in which the heat transfer surfaces contact particles in the duct.

9. A method according to claim 1 in which the particles comprise coke.

10. A method according to claim 1 in which the fuel is a sulphur-containing fuel.

11. A method according to claim 10 in which the particles comprise alkaline earth metal oxide.

12. A method according to claim 11 wherein the gaseous product leaving the top of the bed is substantially free of sulphur.

13. A method according to claim 1 in which the part or full combustion is effected under elevated pressure.

14. A method according to claim 1 in which the particles comprise alkali metal compounds.

15. A method according to claim 1 in which a gas comprising steam is passed into the bottom of the bed.

16. A method according to claim 1 in which the temperature in the bed is in the range of from 800° C to 1500° C.

17. An apparatus for use in at least partly combusting a fuel at an elevated temperature in a bed of fluidizable particulate solids, the apparatus comprising a vessel for containing the bed in a selected volume, a gas distributor for distributing an oxygen-containing fluidizing gas into the bottom of said volume substantially uniformly across the horizontal cross-section of the bottom of said volume, a conduit above the top of said volume through which gas leaving the volume can pass out of the vessel, at least one duct having an upper end open to a top region of the bed volume and a lower end open to a bottom region of the bed volume so as to provide communication through the duct between top and bottom regions of the bed volume, the duct being so constructed and/or arranged that substantially no fluidizing gas will pass thereinto from said volume and so that said particulate solids will enter the upper end of the duct and pack therein to a greater apparent density than the apparent density of said bed contained in said volume and a fuel supply means for passing fuel into the bottom region through the lower end of the duct whereby to mix the fuel with solids at the lower end of the duct and to cause the resulting mixture of solids and fuel to pass into the bottom region of the bed volume so as to disperse the fuel among the particulate solids in the bottom region of said bed volume.

18. Apparatus according to claim 17 in which the duct comprises a substantially vertical part between the upper and lower ends, which part is outside the vessel.

19. Apparatus according to claim 18 in which the duct has a lower part, including the said lower end, which extends towards the vessel at an angle of less than 180° relatively to the substantially vertical part, and said fuel feeding means comprises a conduit having an end terminating in the lower part of the duct, first connection means adapted for connecting the conduit to a source of a conveying or transporting gas, and second connecting means between said first connecting means and the said end of the conduit adapted for connecting the conduit to a source of the fuel.

20. Apparatus according to claim 17 comprising heat transfer surfaces disposed in the volume of the bed above the level of the lower end of the duct and below the level of the upper end of the duct.

21. Apparatus according to claim 17 in which the maximum cross-sectional area of the duct does not exceed 6% of the horizontal cross-sectional area of the interior of the vessel where the vessel laterally bounds the volume of the bed.

22. Apparatus according to claim 18 in which the duct is provided with heat transfer surfaces.

23. Apparatus according to claim 22 in which the heat transfer surfaces are constructed and/or arranged for promoting mixing within the duct of particles which have contacted heat transfer surfaces with particles which have not contacted heat transfer surfaces.

24. Apparatus according to claim 17 comprising a plurality of ducts symmetrically disposed in relation to the vessel.

25. Apparatus according to claim 17 comprising means operable to provide a stream comprising oxygen-containing gas at an elevated pressure to the distributor.

* * * * *